US007006237B2

(12) United States Patent
Iwata

(10) Patent No.: US 7,006,237 B2
(45) Date of Patent: Feb. 28, 2006

(54) LASER BEAM POSITIONING DEVICE FOR LASER PROCESSING EQUIPMENT

(75) Inventor: Takaaki Iwata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/473,949

(22) PCT Filed: Mar. 26, 2002

(86) PCT No.: PCT/JP02/02899

§ 371 (c)(1), (2), (4) Date: Oct. 3, 2003

(87) PCT Pub. No.: WO03/080283

PCT Pub. Date: Oct. 2, 2003

(65) Prior Publication Data

US 2004/0105092 A1 Jun. 3, 2004

(51) Int. Cl.
*G01B 11/14* (2006.01)

(52) U.S. Cl. ....................................... 356/614; 356/620

(58) Field of Classification Search ................ 356/614, 356/620, 622

See application file for complete search history.

(56) References Cited

U.S. PATENT DOCUMENTS

| | | | | |
|---|---|---|---|---|
| 4,941,082 A | | 7/1990 | Pailthorp et al. | |
| 5,751,585 A | * | 5/1998 | Cutler et al. | 700/161 |
| 5,798,927 A | * | 8/1998 | Cutler et al. | 700/188 |
| 2003/0156323 A1 | * | 8/2003 | Overbeck | 359/385 |

FOREIGN PATENT DOCUMENTS

| | | |
|---|---|---|
| JP | 63-229419 | 9/1988 |
| JP | 6-285654 | 10/1994 |

* cited by examiner

*Primary Examiner*—Gregory J. Toatley, Jr.
*Assistant Examiner*—Roy M. Punnoose
(74) *Attorney, Agent, or Firm*—Leydig, Voit & Mayer, Ltd.

(57) ABSTRACT

A laser beam positioning device for a laser processing equipment includes a beam scanning unit that scans a laser beam to process a work piece according to a command value; a measurement unit that measures a processed position on the work piece; and a control unit that calculates the command value from coordinates of the processed position and coordinates of a target position. The control unit calculates an unknown parameter matrix, which optimally determines the command value to guide the laser beam onto the target position on the work piece, by weighting the coordinates of the processed position and the command value, according to a distance between the coordinates of the target position and the coordinates of the processed position.

10 Claims, 11 Drawing Sheets

LASER BEAM POSITIONING DEVICE FOR LASER PROCESSING EQUIPMENT

TECHNICAL FIELD

The present invention relates to a laser beam positioning device for a laser processing equipment, which can improve the positioning accuracy of laser beam or respond to an environmental change with flexibility while maintaining the positioning accuracy of a laser beam.

BACKGROUND ART

Recently, the information-communication industry has accomplished a rapid advancement with an increase in demand for the personal computer, the cellular phone, etc. In the fields of electronics and semiconductor, which are led by the information-communication industry, the electronic parts constituting a device become miniaturized and highly integrated, from which necessity for processing technology using laser is increasing, in regards to drilling, cutting, trimming, and scribing of printed circuit boards (PCBs) on which the electronic parts are mounted.

As a processing technology using the laser, for example in Japanese Application Laid Open No. 63-229419 (conventional technology), a lens distortion compensator is disclosed that compensates the inherent distortion of a condensing lens for laser beam, and an example of embodiment for a laser processing equipment using the lens distortion compensator is described. FIG. 11 is a schematic diagram of a laser processing equipment equipped with the lens distortion compensator according to this conventional technology. The lens distortion compensator 107 controls two scanners 102 and 103 for the output from a laser oscillator 101, and the laser processing equipment irradiates the laser beam onto a work piece through a condensing lens 106 by moving two mirrors 104 and 105 that are driven by the scanners 102 and 103. Since the laser processing equipment is equipped with a CCD camera 107 as a condensing point position detection method, while having an X-Y pulse table 108 that can move in the XY direction, a monitor television 110 that displays the optical point position through a camera controller 109 from the output signal of the CCD camera 107 with the scanner position, a table controller 111 that controls the X-Y pulse table 108, and a digital operation processing device 112 that can memorize and compensate the amount of movements of the X-Y pulse table 108, it can calculate the compensation coefficient using a single polynomial model beforehand for every lens, memorize the compensation coefficient, and when using the same lens, reads out a corresponding compensation coefficient to compensate the drive signals for X and Y signals.

However, since the conventional technology only corrects the irradiation position of the laser beam by compensating the lens distortion of a condensing lens without taking the size of a work piece and the time variation of status of the laser processing equipment etc. into consideration, it has a problem that the position accuracy of a processing hole deteriorates depending on the size of processing area, working hours, etc.

Besides, optical systems other than the condensing lens become complicated when the equipment is formed into a multi-beam system for example, in order to enhance workability. However, since the compensation that only works with distortion of a condensing lens is performed, it lacks of flexibility and extendibility that can respond to the complexity.

Furthermore, in the case of the conventional technology, since the single polynomial is used as a model, the model error exists between the single polynomial model with fixed coefficients of a polynomial and the actual system, resulting in a limit in the positioning accuracy of the laser beam.

When using a polynomial model, determination of the degree of the polynomial model is made depending how nonlinear the characteristic of the system of interest is and how good the approximation accuracy should be. In general, although the approximation accuracy becomes good when raising the degree of a polynomial, a problem is that the necessary calibration points increase or the calculation time of command values that controls the irradiation position of a laser beam increases, resulting in a decline of workability.

It is an object of the present invention, therefore, to achieve a laser processing equipment that reduces errors caused by model errors between the conventional polynomial model and the real system, suppresses any increase in calibration time and calculation time even when the approximation accuracy of the polynomial model is raised, and maintains the processing accuracy even against various changing factors, such as the size of work piece, time variation of status of the system, etc.

DISCLOSURE OF THE INVENTION

The laser beam positioning device for a laser processing equipment according to one aspect of the present invention includes a stage where a work piece is placed; a laser oscillator that emits a laser beam; an optical unit that guides the laser beam so that the laser beam irradiates the work piece placed on the stage; a beam scanning unit that scans the laser beam guided by the optical unit, based on a command value, to process the work piece; a measurement unit that measures a processed position on the work piece at which the laser processing has been performed; and a control unit that calculates the command value from coordinates of the processed position and coordinates of a target position, wherein the control unit calculates an unknown parameter matrix by weighting the coordinates of the processed position and the command value, according to a distance between the coordinates of the target position and the coordinates of the processed position, the unknown parameter matrix optimally determining the command value to guide the laser beam onto the target position on the work piece.

The laser beam positioning device for a laser processing equipment according to another aspect of the present invention includes a stage where a work piece is placed; a laser oscillator that emits a laser beam; an optical unit that guides the laser beam so that the laser beam irradiates the work piece placed on the stage; a beam scanning unit that scans the laser beam, based on a command value, to process the work piece; a measurement unit that measures a processed position on the work piece at which the laser processing has been performed; and a control unit that calculates the command value from coordinates of the processed position and coordinates of a target position, wherein the control unit calculates an unknown parameter matrix by dividing a surface of the work piece into a plurality of areas, applying a weight of one to an area with the target position, and applying a weight less than one to an area without the target position.

According to the present invention, the control unit can calculate an unknown parameter matrix that optimally determines the command value to guide the laser beam onto the target position on the work piece by applying a weight to the coordinates of the processed position and the command value, according to a distance between the coordinates of the target position and the coordinates of the processed position.

The control unit calculates the unknown parameter matrix by weighting the coordinates of the processed position and the command value, according to a normal distribution of distances between the coordinates of the target position and the coordinates of the processed position.

According to the present invention, the control unit can calculate an unknown parameter matrix that optimally determines the command value to guide the laser beam onto the target position on the work piece by applying a weight of normal distribution to the coordinates of the processed position and the command value, according to a distance between the coordinates of the target position and the coordinates of the processed position.

The control unit calculates the unknown parameter matrix by weighting the coordinates of the processed position and the command value, according to a distance between coordinates of a representative position of a target position group having a plurality of the target positions and the coordinates of the processed position.

According to the present invention, the control unit can calculate an unknown parameter matrix that optimally determines the command value to guide the laser beam onto the target position on the work piece by applying a weight to the coordinates of the processed position and the command value, according to a distance between coordinates of a representative position of a target position group and the coordinates of the processed position.

The representative position is the center of the gravity of the target position group.

According to the present invention, the control unit can calculate an unknown parameter matrix that optimally determines the command value to guide the laser beam onto the target position on the work piece by applying a weight to the coordinates of the processed position and the command value, according to a distance between coordinates of the center of the gravity, i.e., the representative position, of a target position group and the coordinates of the processed position.

The laser beam positioning device for a laser processing equipment according to still another aspect of the present invention includes a stage where a work piece is placed; a laser oscillator that emits a laser beam; an optical unit that guides the laser beam so that the laser beam irradiates the work piece placed on the stage; a beam scanning unit that scans the laser beam, based on a command value, to process the work piece; a measurement unit that measures a processed position on the work piece at which the laser processing has been performed; and a control unit that calculates the command value from coordinates of the processed position and coordinates of a target position, wherein the control unit calculates an unknown parameter matrix by weighting the coordinates of the processed position and the command value, according to a forgetting factor k where $0 \leqq k \leqq 1$ associated with the time information of the command value, the unknown parameter matrix optimally determining the command value to guide the laser beam onto the target position on the work piece.

According to the present invention, the control unit can calculate an unknown parameter matrix that optimally determines the command value to guide the laser beam onto the target position on the work piece by dividing a surface of the work piece into a plurality of areas, applying a unity weight to a corresponding area with the target position, and applying a weight less than unity to the rest of non-corresponding areas.

The number of the plurality of areas is four.

According to the present invention, the control unit can calculate an unknown parameter matrix that optimally determines the command value to guide the laser beam onto the target position on the work piece by dividing a surface of the work piece into four areas, applying a unity weight to a corresponding area with the target position, and applying a weight less than unity to the rest of three areas.

The areas on the surface of the work piece are set as areas bordering on a concentric circle that makes distance from the center the same.

According to the present invention, the control unit can calculate an unknown parameter matrix that optimally determines the command value to guide the laser beam onto the target position on the work piece by dividing a surface of the work piece into areas bordering on a concentric circle that makes distance from the center the same, applying a unity weight to a corresponding area with the target position, and applying a weight less than unity to the rest of areas.

The laser beam positioning device for a laser processing equipment according to still another aspect of the present invention includes a stage where a work piece is placed; a laser oscillator that emits a laser beam; an optical unit that guides the laser beam so that the laser beam irradiates the work piece placed on the stage; a beam scanning unit that scans the laser beam; a measurement unit that measures a processed position on the work piece at which the laser processing has been performed; and a control unit that calculates the command value from coordinates of the processed position and coordinates of a target position, wherein the control unit calculates an unknown parameter matrix by using a forgetting factor k ($0 \leqq k \leqq 1$) that changes the amount of weighting to the coordinates of the processed position and the command value based on which the beam scanning unit performed the processing at the processed position, according to the time order of information of the command value, the unknown parameter matrix optimally determining the command value to guide the laser beam onto the target position on the work piece.

According to the present invention, the control unit can calculate an unknown parameter matrix that optimally determines the command value to guide the laser beam onto the target position on the work piece by using an forgetting factor k ($0 \leqq k \leqq 1$) that changes the amount of weighting to the coordinates of the processed position and the command value based on which the beam scanning unit performed the processing at the processed position, according to the time order of the command value information.

The control unit calculates X from the following equation:

$$X=(kD+d)^{-1}(kN+n)$$

where X is the unknown parameter matrix; k is the forgetting factor; $D=A_{ex}{}^TQA_{ex}$, $N=A_{ex}{}^TQB_{ex}$, and $Q=W^TW$ where $A_{ex}$ is a matrix in which a set of data indicating any one of 1) a plurality of combination of coordinates of the work piece position at the time of the first calibration and 2) a plurality of combination of coordinates of the target position are arranged by the number of calibration point; $B_{ex}$ is a matrix formed by the command value corresponding to $A_{ex}$; and W is a weight matrix formed by values for weighting $A_{ex}$ and $B_{ex}$; d is a matrix corresponding to D at the time of a new calibration; and n is a matrix corresponding to N.

According to the present invention, the control unit can calculate X using $$X=(kD+d)^{-1}(kN+n)$$

where, X is the unknown parameter matrix that optimally determines the command value to guide the laser beam onto the target position on the work piece; k is the forgetting factor ($0 \leqq k \leqq 1$) that changes the amount of weighting to the coordinates of the processed position and the command value based on which the beam scanning unit performed the processing at the processed position, according to the time order of the command value information; $Q=W^TW$, $D=A_{ex}{}^TQA_{ex}$, $N=A_{ex}{}^TQB_{ex}$, where, $A_{ex}$ is a matrix in which a set of data in which a plurality of combination of coordinates of the work piece position at the time of the first calibration and coordinates of their equivalent target position are arranged by the number of calibration point, $B_{ex}$ is a matrix comprising the command value to the beam scanning unit corresponding to $A_{ex}$, and W is a weight matrix comprising weight values that should be applied to $A_{ex}$ and $B_{ex}$; d is a matrix corresponding to D at the time of a new calibration; and n is a matrix corresponding to N.

The control unit calculates X from the following equation:

$$X=\left\{\frac{P_i}{k}-\frac{P_i}{k}a^T\left(q^{-1}+a\frac{P_i}{k}a^T\right)^{-1}a\frac{P_i}{k}\right\}(kN+n)$$

where X is the unknown parameter matrix; k is the forgetting factor; $D=A_{ex}{}^TQA_{ex}$, $N=A_{ex}{}^TQB_{ex}$, and $Q=W^TW$ where $A_{ex}$ is a matrix in which a set of data indicating any one of 1) a plurality of combination of coordinates of the work piece position at the time of the first calibration and 2) a plurality of combination of coordinates of the target position are arranged by the number of calibration point; $B_{ex}$ is a matrix formed by the command value corresponding to $A_{ex}$; and W is a weight matrix formed by values for weighting $A_{ex}$ and $B_{ex}$; d is a matrix corresponding to D at the time of a new calibration; n is a matrix corresponding to N; and $a=A_{ex}$, $q=Q$, $b=B_{ex}$, and $P=D^{-1}$ when the number of test points at the time of a new calibration is smaller than the number of terms of the unknown parameter matrix.

According to the present invention, the control unit can calculate X, when the number of test points at the time of a new calibration is fewer than the number of terms of the unknown parameter matrix, and when $a=A_{ex}$, $q=Q$, $b=B_{ex}$, and $P=D^{-1}$, using $$X=\left\{\frac{P_i}{k}-\frac{P_i}{k}a^T\left(q^{-1}+a\frac{P_i}{k}a^T\right)^{-1}a\frac{P_i}{k}\right\}(kN+n)$$

where, X is the unknown parameter matrix that optimally determines the command value to guide the laser beam onto the target position on the work piece; k is the forgetting factor ($0 \leqq k \leqq 1$) that changes the amount of weighting to the coordinates of the processed position and the command value based on which the beam scanning unit performed the processing at the processed position, according to the time order of the command value information; $Q=W^TW$, $D=A_{ex}{}^TQA_{ex}$, $N=A_{ex}{}^TQB_{ex}$, where, $A_{ex}$ is a matrix in which a set of data in which a plurality of combination of coordinates of the work piece position at the time of the first calibration and coordinates of their equivalent target position are arranged by the number of calibration point, $B_{ex}$ is a matrix comprising the command value to the beam scanning unit corresponding to $A_{ex}$, and W is a weight matrix comprising weight values that should be applied to $A_{ex}$ and $B_{ex}$; d is a matrix corresponding to D at the time of a new calibration; and n is a matrix corresponding to N.

BEST MODE FOR CARRYING OUT THE INVENTION

The beam positioning method and the beam positioning device for a laser processing equipment according to the present invention can be applied to a single-beam laser processing equipment or a multi-beam laser processing equipment explained in detail below. Hereafter, with reference to the accompanying drawings, preferred embodiments of the beam positioning method and the beam positioning device for a laser processing equipment according to the present invention are explained in detail.

Figure 1:
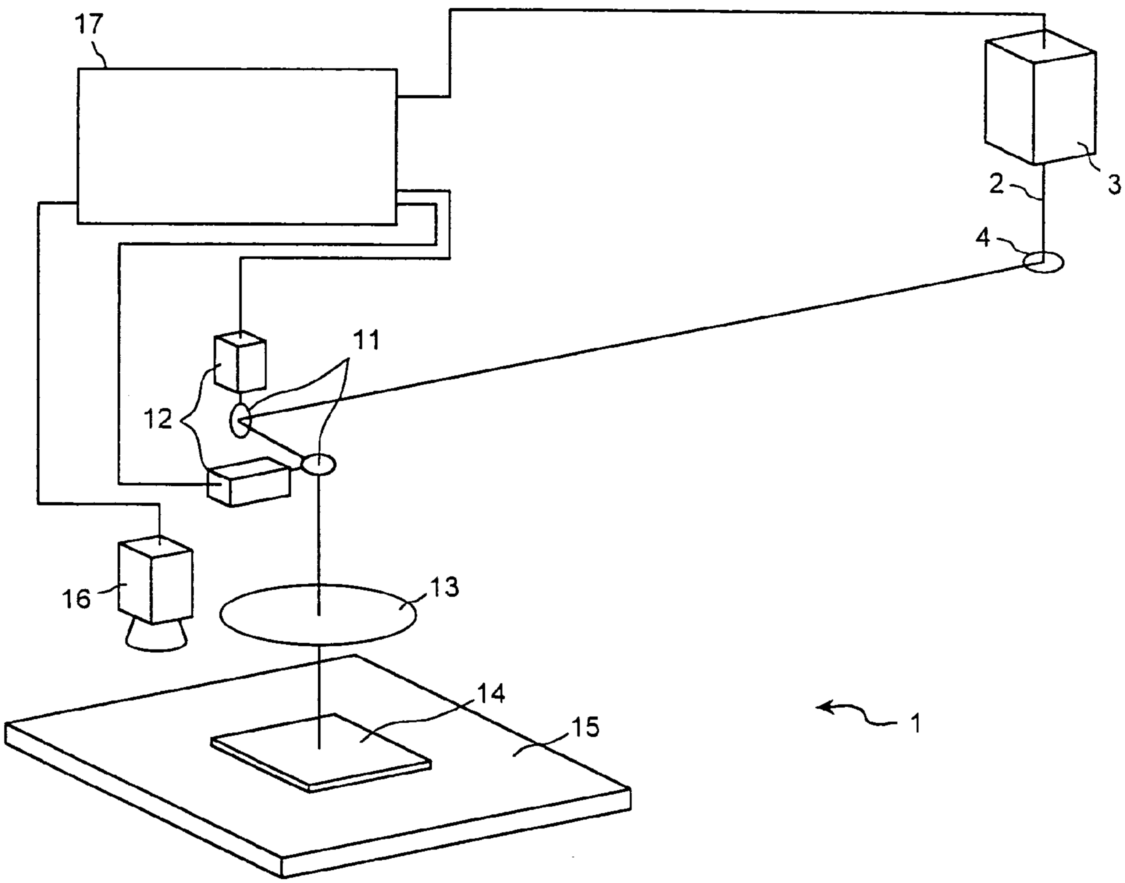
FIG. 1 is a schematic diagram of a single-beam laser processing equipment.

First Embodiment (1) Configuration and Operation of a Single-Beam Laser Processing Equipment FIG. 1 is a schematic diagram of a single-beam laser processing equipment. In this figure, a single-beam laser processing equipment 1 includes a laser oscillator 3 that emits a laser beam 2, some bending mirrors 4 that switch optical path of the laser beam, two deflection galvanometer mirrors 11 placed on the optical path of the beam 2, two deflection galvanometer scanners 12 to change the angle of the deflection galvanometer mirrors, a fθ lens 13 to condense the beam, an XY stage 15 on which a work piece 14 is placed, a CCD camera 16 to monitor the processing hole of the work piece 14, and a control box 17 to control the laser oscillator 3, the XY stage 15, and the galvanometer scanner 12.

The optical path of the laser beam from the laser oscillator 3 is constituted by the bending mirrors 4 and the galvanometer mirror 11. The control box 17 triggers the laser oscillator 3 with a preset timing to emit the laser beam 2. The emitted laser beam 2 is condensed by the fθ lens 13 through the bending mirror 4 placed in the middle of the optical path of the beam and the deflection galvanometer mirror 11, reaches the work piece 14 placed on the XY stage, and processes the work piece 14. As for the galvanometer mirrors 11, each mirror is separately attached to the galvanometer scanners 12, and it is possible to make a trochoidal movement. The galvanometer scanner 12, the laser oscillator 3, the CCD camera 16, and the XY stage 15 can be separately controlled by the control box 17.

(2) Configuration and Operation of Multi-Beam Laser Processing Equipment

Figure 2:
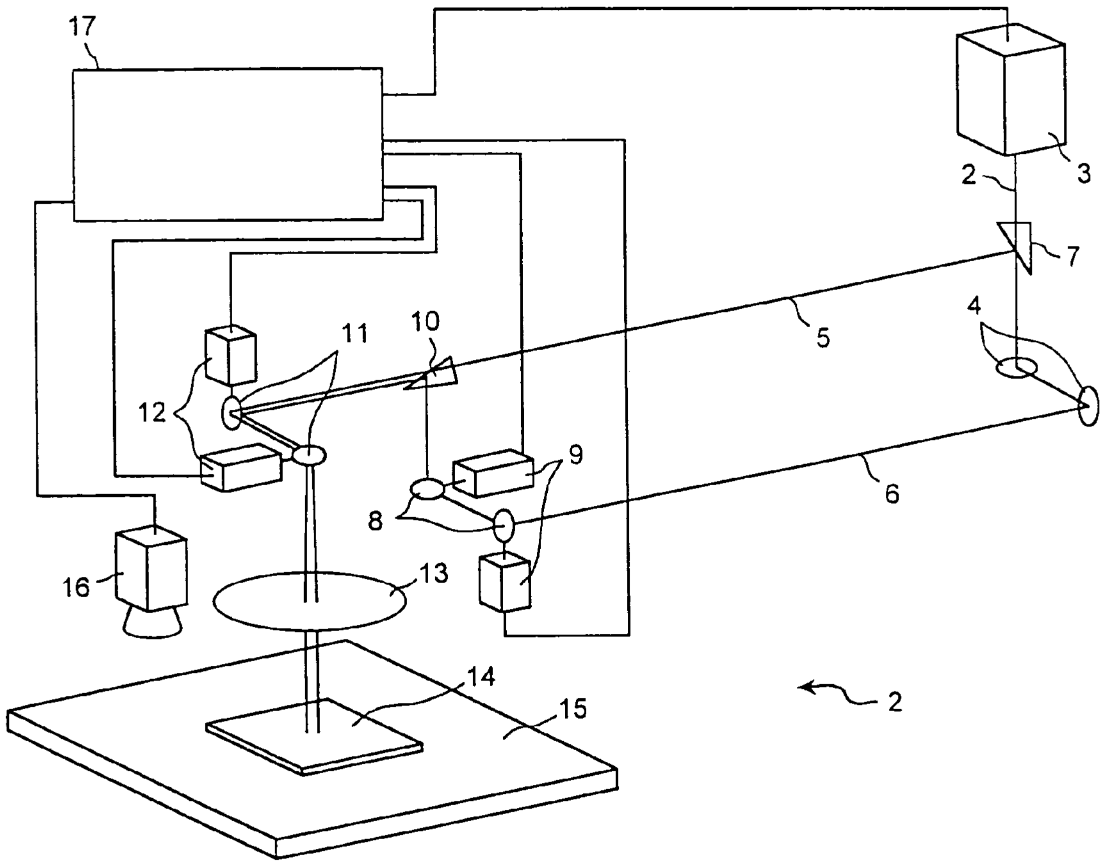
FIG. 2 is a schematic diagram of a multi-beam laser processing equipment.

FIG. 2 is a schematic diagram of a multi-beam laser processing equipment. In this figure a multi-beam laser processing equipment 2 includes a prism beam splitter 7 that spectroscopically splits the laser beam 2, two deflection galvanometer mirrors 8 placed on the optical path of the spectroscopic laser beam 6 that passes the bending mirror 4 among the split laser beams, two deflection galvanometer scanners 9 to change the angle of the deflection galvanometer mirror 8, and another beam splitter 10 to combine two spectroscopic laser beams 5 and 6 divided by the prism beam splitter 7. Other configuration is basically the same as that of the single-beam laser processing equipment shown in FIG. 1 with the same number assigned to the same part. Now let us call 11, 8, 12, 9, 5, and 6 as the main galvanometer mirror, sub galvanometer mirror, main galvanometer scanner, sub galvanometer scanner, main galvanometer beam, and sub galvanometer beam, respectively, to distinguish between the deflection galvanometer mirrors 8 and 11, between the deflection galvanometer scanners 9 and 12, and between the laser beams 5 and 6.

In FIG. 2, the laser beam 2 emitted from the laser oscillator 3 is split into the main laser beam 5 and the sub laser beam 6 by the prism beam splitter after passing a couple of bending mirrors 4. Then, the sub laser beam 6 passes a couple of bending mirror 4 and two sub galvanometer mirror 8, and reaches the coupling beam splitter 10 that is placed on the optical path of the main laser beam 5 to be combined to the main laser beam 5 again. After that, the main laser beam 5 and the sub laser beam 6 pass two main galvanometer mirrors 11, and condensed by the fθ lens 13. The condensed main laser beam 5 and sub laser beam 6 process a hole into the work piece 14 that is placed on the XY stage 15. The sub galvanometer mirror 8 and the main galvanometer mirror 11 are fixed on the sub galvanometer scanner 9 and the main galvanometer scanner 12, respectively, and the galvanometer scanners can control the angle by the control box 17.

Normally, as for the single-beam laser processing equipment, the single oscillated beam processes one hole, and the single hole processing technology is the same as the main deflection technology in the multi-beam laser processing equipment.

On the other hand, with multi-beam laser processing equipment 2, two holes are usually processed by single oscillated beam. Now, the hole processed by the main laser beam 5 and the hole processed by the sub laser beam 6 are defined as a main hole and a sub hole, respectively.

Figure 3:
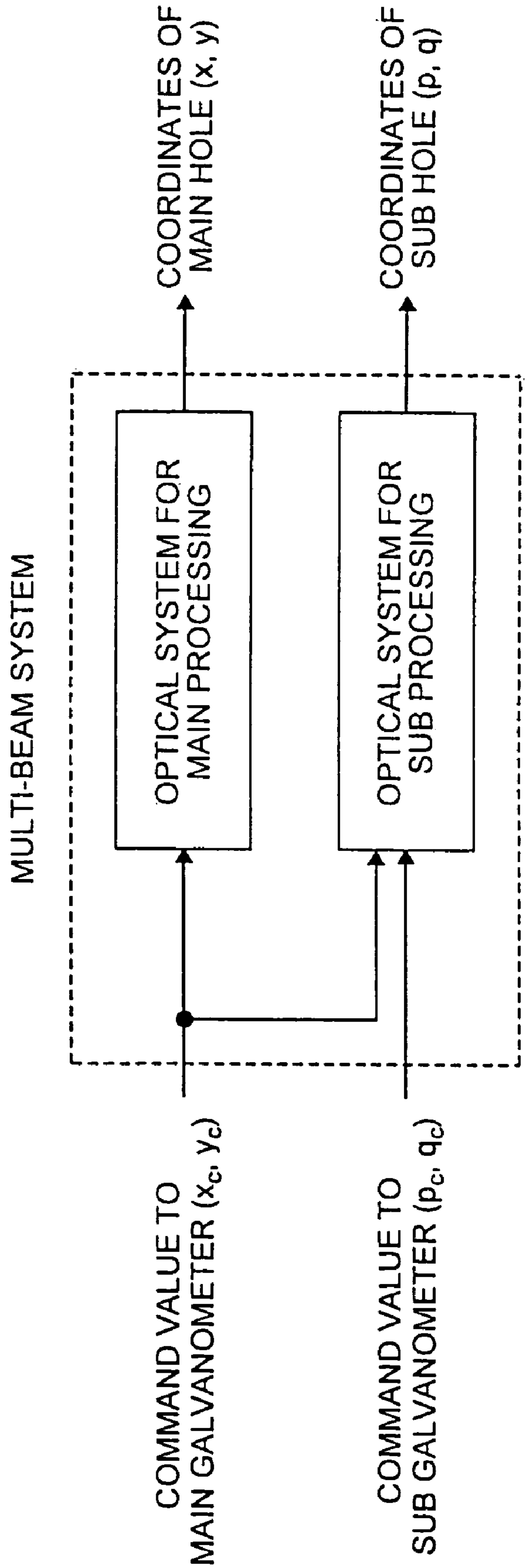
FIG. 3 is a block diagram representing the relationship between command values to the main galvanometer scanner 12 and sub galvanometer scanner 9 and coordinates of the main hole and sub hole.

FIG. 3 is a block diagram representing the relationship between command values to the main galvanometer scanner 12 and sub galvanometer scanner 9 and coordinates of the main hole and sub hole. The coordinates (x, y) of a main hole and the coordinates (p, q) of a sub hole are determined by the command value ($x_c$, $y_c$) that adjusts the angle of the two main galvanometer scanners 12 and four variables of the command value ($x_c$, $y_c$) that adjusts the angle of the main galvanometer scanner 12 and the command value ($p_c$, $q_c$) that adjusts the angle of the sub galvanometer scanner 9, respectively. That is, if the command value to a galvanometer scanner is decided, consequently, it means that the coordinates of a hole are determined.

(3) Positioning and the Output of a Command Value by Laser Processing Equipment

Figure 4:
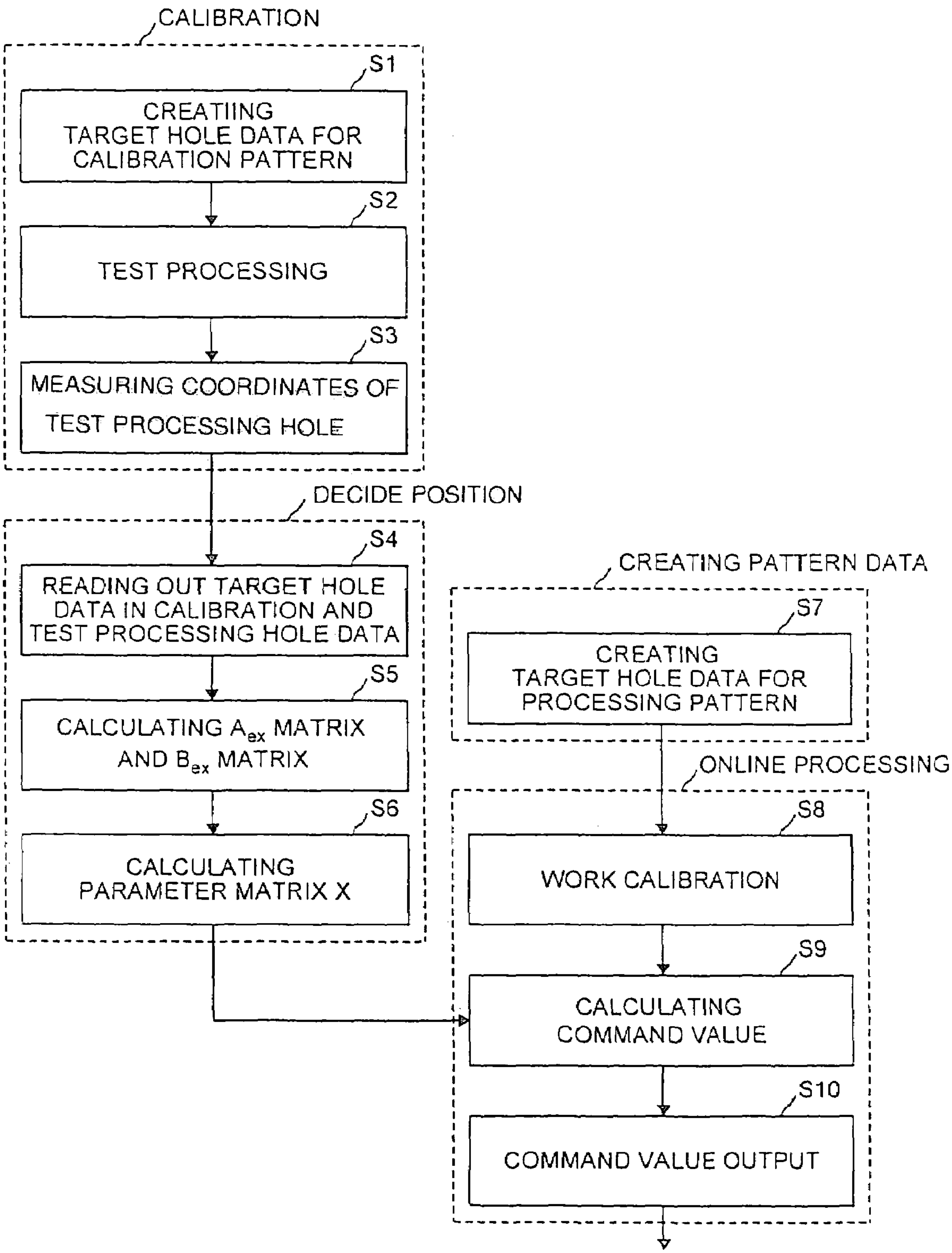
FIG. 4 is a flowchart illustrating the typical positioning steps in a laser processing equipment.

FIG. 4 is a flowchart illustrating the typical positioning steps in laser processing equipment. The positioning step shown in the figure is a technology applicable common to the single-beam laser processing equipment 1 and the multi-beam laser processing equipment 2. Since a technology peculiar to the multi-beam laser processing equipment 2 also exists as shown in FIG. 3, in order to avoid that explanation becomes complicated hereafter, it explains centering on the multi-beam laser processing equipment 2. It is noted when a technology is applicable to the single-beam laser processing equipment 1, In FIG. 4, the general positioning procedure is roughly divided into four processing steps: a calibration step comprising a creation step of a calibration pattern (step S1), a test processing step (step S2), and a measurement step of test processing position coordinates (step S3); a positioning step comprising a reading step of the data in a calibration (step S4), a calculation step of a target position coordinates matrix and a command value matrix (step S5), and a calculation step of an unknown parameter matrix (step S6); a pattern data creation step comprising a creation step of the target position data of a processing pattern (step S7); and an on-line-processing step comprising a work compensation step (step S8), a command value calculation step (step S9), and an output step of a command value (step S10).

First of all, the main target position data (that the main target position coordinates are described by the number of test run), and sub target position data (that sub target position coordinates are described by the number of test run) for the calibration are prepared (step S1). Patterns, such as a lattice-like arrangement pattern and a random pattern, are sufficient as the main target position data or sub target position data. Although the number of data varies with position accuracy of drilling, 100 data is set up in the example of the operation explained later.

A hole is actually made into the material for test processing with a laser beam using the data for the calibration (step S2). And the position of the processed hole is imaged with the CCD camera 16, and the coordinates of the processed hole are measured (step S3). The measured coordinates data of the processed hole is passed to the following positioning step. The actual measurement is performed by moving the XY table 15 directly under the CCD camera 16 and imaging the position of a test processing hole. Since the positions of the galvanometer mirror 11 and the CCD camera 16 are fixed, if the relative position of both is known, the coordinates of the exact hole position can be obtained.

With the multi-beam laser processing equipment 2, although two holes, a main hole and a sub hole, are simultaneously processed by the single laser pulse, the calibration is performed in order of the main hole and a sub hole. It is because the sub hole is unnecessary at the time of the calibration of the main deflection, and the main hole is unnecessary at the time of the calibration of the sub deflection. In addition, since it is necessary to discriminate one from the other if a main hole and a sub hole exist simultaneously when measuring the position of a hole with the CCD camera, intercepting one of the two beams by using a shutter etc. needs to be considered at the time of a calibration.

The positioning step is performed for both the main hole and the sub hole. Both processing is in common, except that the number of columns of the matrix is different due to difference in the number of unknown parameters (number of terms of the polynomial).

The command value data of the sub deflection for the calibration, processing position data, and the target position data of the main deflection at that time are read (step S4). Then, $A_{ex}$ matrix is obtained from the processing position data and the target position data, and $B_{ex}$ matrix is obtained from the command value data (step S5). In order to optimize the position difference between the target hole and the actual hole, the $A_{ex}$ matrix and the $B_{ex}$ matrix obtained at the step S5 are used to calculate an unknown parameter matrix X, based on a certain merit function (for example, least-squared method) (step S6). The unknown parameter matrix X that is obtained here is passed to the on line processing step.

At the pattern data creation step, the operator of a laser processing equipment creates the target position data of a desired pattern of making holes on a printed circuit board etc., and passes this data to the on line processing (step S7).

At the work compensation of the on line processing step, when the work piece 14 is actually set on the XY stage, distortion of the shape of a work piece, deformation, etc. are detected, and the compensation value is calculated (step S8). At an actual process, the multi-beam laser processing equipment 2 measures the coordinates of the mark pre-attached to the work piece using the CCD camera and the XY stage. When ideally installed in the preset position with no expansion or contraction in a work piece, the process can be performed as it is. In practice, however, the work piece may have expansion or contraction, or it is difficult to precisely set the work piece in a preset position on the XY stage. It is necessary, therefore, to correct the target position data that contains the processing pattern based on the coordinates of the mark, and this correction processing is the work compensation. Then, from the work compensation value calculated at the step S8, and the output value in of the positioning step, a command value is calculated (step S9), and the command value is output to the galvanometer scanner (step S10).

(4) Estimation of the Inverse Mapping Approximation Model by the Least Squared Method When considering the direction of this physical correlation as the mapping of the positive direction, the mapping of a negative direction is needed in FIG. 3 on the actual processing. The multi-beam laser processing equipment 2 must calculate the command value that should be given to the galvanometer scanner for the coordinates of the hole that the operator wants to make. Therefore, the inverse mapping model is applied to the multi-beam laser processing equipment 2 so that the inverse mapping can be performed inside. The block diagram illustrating this relation is shown in FIG. 5.

Figure 5:
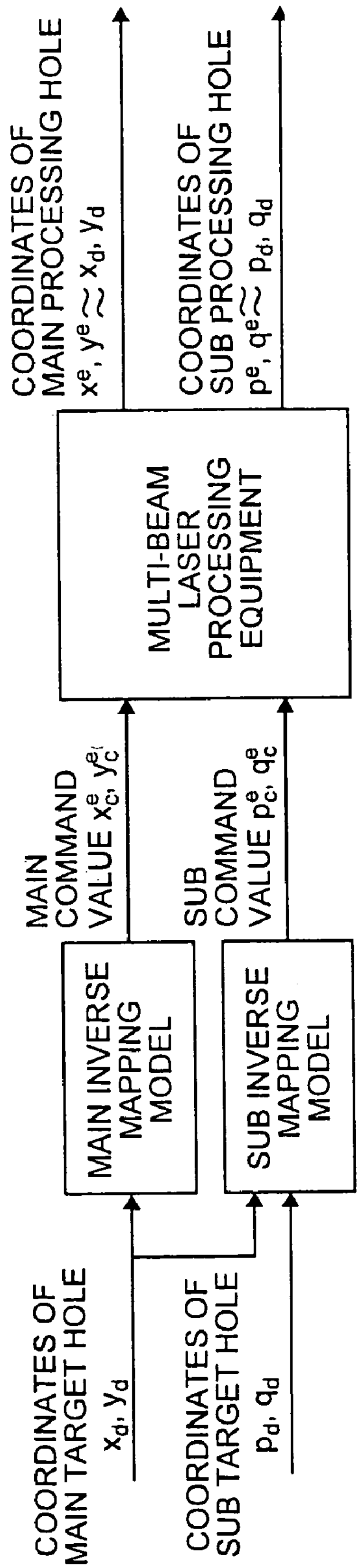
FIG. 5 is a block diagram representing the relationship between the target position coordinate, the command value, and the processing position coordinate in the multi-beam laser processing equipment where the reverse mapping model is applied to the block diagram in FIG. 3.

FIG. 5 is a block diagram representing the relation between the target position coordinates, the command value, and the processing position coordinates in the multi-beam laser processing equipment where the reverse mapping model is applied to the block diagram in FIG. 3. The coordinates for the main deflection are x and y, and the coordinates for the sub processing are expressed with p and q. The subscript alphabet c, d, and e indicate a command value (control), a target value (desire), and an estimation value (estimate), respectively.

In this figure, the main target position coordinates $(x_d, y_d)$ are converted into the main command value $(x_c^e, y_c^e)$ by the main inverse mapping model, the control device 17 of the multi-beam laser processing equipment 2 transfers the main command value $(x_c^e, y_c^e)$ to the main galvanometer scanner 12, and then a hole is made in the position of the main hole $(x^e, y^e)$. As for a main hole, although it is an ideal case if the relation of $x^e=x_d$ and $y^e=y_d$ is realized, an error is supposed to occur in practice. On the other hand, as for a sub hole, when converted into a sub deflection command value $(p_c^e, q_c^e)$ by the sub inverse mapping model, it differs from the main hole to use not only sub target position coordinates $(p_d, q_d)$, but also the main target position coordinates $(x_d, y_d)$. As mentioned above, it is because a sub hole is determined by a total of four variables: the command value that adjusts the angle of the main galvanometer scanner 12 and the command value that adjusts the angle of the sub galvanometer scanners 9.

The inverse mapping approximation model, shown in FIG. 5, and how to obtain the unknown parameter by the least-squares method are explained in detail.

In the present invention, the polynomial shown below is used as the inverse mapping approximation model. The main command values $x_c^e$ and $y_c^e$ are expressed as, $$\begin{cases} x_c^e = m_{0,0} + m_{1,0}x_d + m_{0,1}y_d + m_{1,1}x_dy_d + m_{2,0}x_d^2 + m_{0,2}y_d^2 + \cdots \\ y_c^e = n_{0,0} + n_{1,0}x_d + n_{0,1}y_d + n_{1,1}x_dy_d + n_{2,0}x_d^2 + n_{0,2}y_d^2 + \cdots \end{cases} \quad (1)$$

where $m_{i,j}$, $n_{i,j}$ (i, j=0, 1, 2, . . . are equivalent to the order of $x_d$ and $y_d$, respectively) are the coefficients of the polynomial, and are the unknown p/arameters.

Similarly, the sub command values $p_c^e$ and $q_c^e$ are expressed as, $$\begin{cases} p_c^e = m_{0,0,0,0} + m_{1,0,0,0}x_d + m_{0,1,0,0}y_d + m_{0,0,1,0}p_d + m_{0,0,0,1}q_d + \cdots \\ q_c^e = n_{0,0,0,0} + n_{1,0,0,0}x_d + n_{0,1,0,0}y_d + n_{0,0,1,0}p_d + n_{0,0,0,1}q_d + \cdots \end{cases} \quad (2)$$

where $m_{i,j,k,l}$, $n_{i,j,k,l}$ (i, j, k, l=0, 1, 2, . . . are equivalent to the order of $x_d$, $y_d$, $p_d$, and $q_d$, respectively) are the coefficients of the polynomial (the unknown parameters).

Then, (1) and (2) can be divided into a known coefficient portion and an unknown coefficient portion by using the matrix expression. In the case of the main deflection, $$\begin{aligned} B^e &= [x_c^e,\ y_c^e] \quad (3) \\ &= [1,\ x_d,\ y_d,\ x_d,\ y_d,\ x_d^2,\ y_d^2,\ \cdots] \begin{bmatrix} m_{0,0}, & n_{0,0} \\ m_{1,0}, & n_{1,0} \\ m_{0,1}, & n_{0,1} \\ m_{1,1}, & n_{1,1} \\ m_{2,0}, & n_{2,0} \\ m_{0,2}, & n_{0,2} \\ \vdots & \vdots \end{bmatrix} \\ &= AX \end{aligned}$$

and in the case of the sub deflection, $$B^e = [p_c^e, q_c^e] \tag{4}$$

$$= [1, x_d, y_d, p_d, q_d, \cdots]\begin{bmatrix} m_{0,0,0,0}, & n_{0,0,0,0} \\ m_{1,0,0,0}, & n_{1,0,0,0} \\ m_{0,1,0,0}, & n_{0,1,0,0} \\ m_{0,0,1,0}, & n_{0,0,1,0} \\ m_{0,0,0,1}, & n_{0,0,0,1} \\ \vdots & \vdots \end{bmatrix}$$

$$= AX$$

The matrix X is referred to as the unknown parameter matrix.

The unknown parameter is, as explained with the flow chart of FIG. 4, obtained from the results of several pre-test run called the calibration. One time of test run gives a set of data, for example xce, yce, x, and y for the main deflection and $x_c^e$, $y_c^e$, $p_c^e$, $q_c^e$, p, and q for the sub deflection. If the test run number is attached on the left, it is possible to define main deflection $${}^1A=[1,{}^1x,{}^1y,{}^1xy,{}^1x^2,{}^1y^2, \ldots]$$

$${}^1B=[{}^1x_c,{}^1y_c] \tag{5}$$

sub deflection $${}^1A=[1,{}^1x_d,{}^1y_d,{}^1p,{}^1q, \ldots]$$

$${}^1B=[{}^1p_c,{}^1q_c] \tag{6}$$

If the test runs for the calibration are performed at 100 points, 100 sets of the ${}^iA$ matrix and ${}^iB$ matrix are obtained. These matrices are arranged vertically and the following matrices are defined further (equivalent to the step S5 in FIG. 4).

$$A_{ex} = \begin{bmatrix} {}^1A \\ {}^2A \\ \vdots \\ {}^{100}A \end{bmatrix} \quad B_{ex} = \begin{bmatrix} {}^1B \\ {}^2B \\ \vdots \\ {}^{100}B \end{bmatrix} \tag{7}$$

What is necessary is just to obtain the unknown parameter matrix X that minimized the following merit function in the least-squared method.

$$J = (A_{ex}X - B_{ex})^T(A_{ex}X - B_{ex}) \tag{8}$$

$$= (B_{ex}^e - B_{ex})^T(B_{ex}^e - B_{ex})$$

The unknown parameter matrix X that minimized J is obtained from $$X=(A_{ex}{}^TA_{ex})^{-1}A_{ex}{}^TB_{ex} \tag{9}$$

(equivalent to the step S6 in FIG. 4). From the unknown parameter matrix X, it is also possible to calculate and output the command value to control the galvanometer scanner (steps S9 and S10 in FIG. 4).

Determination of the degree of the polynomial model is made depending how nonlinear the characteristic of the system of interest is and how good the approximation accuracy should be. In general, although the approximation accuracy becomes good when raising the degree of a polynomial, a problem exists that the necessary calibration points increase or the calculation time of command values in the on line processing increases.

(5) Positioning Process by the Weighting Method

Figure 6:
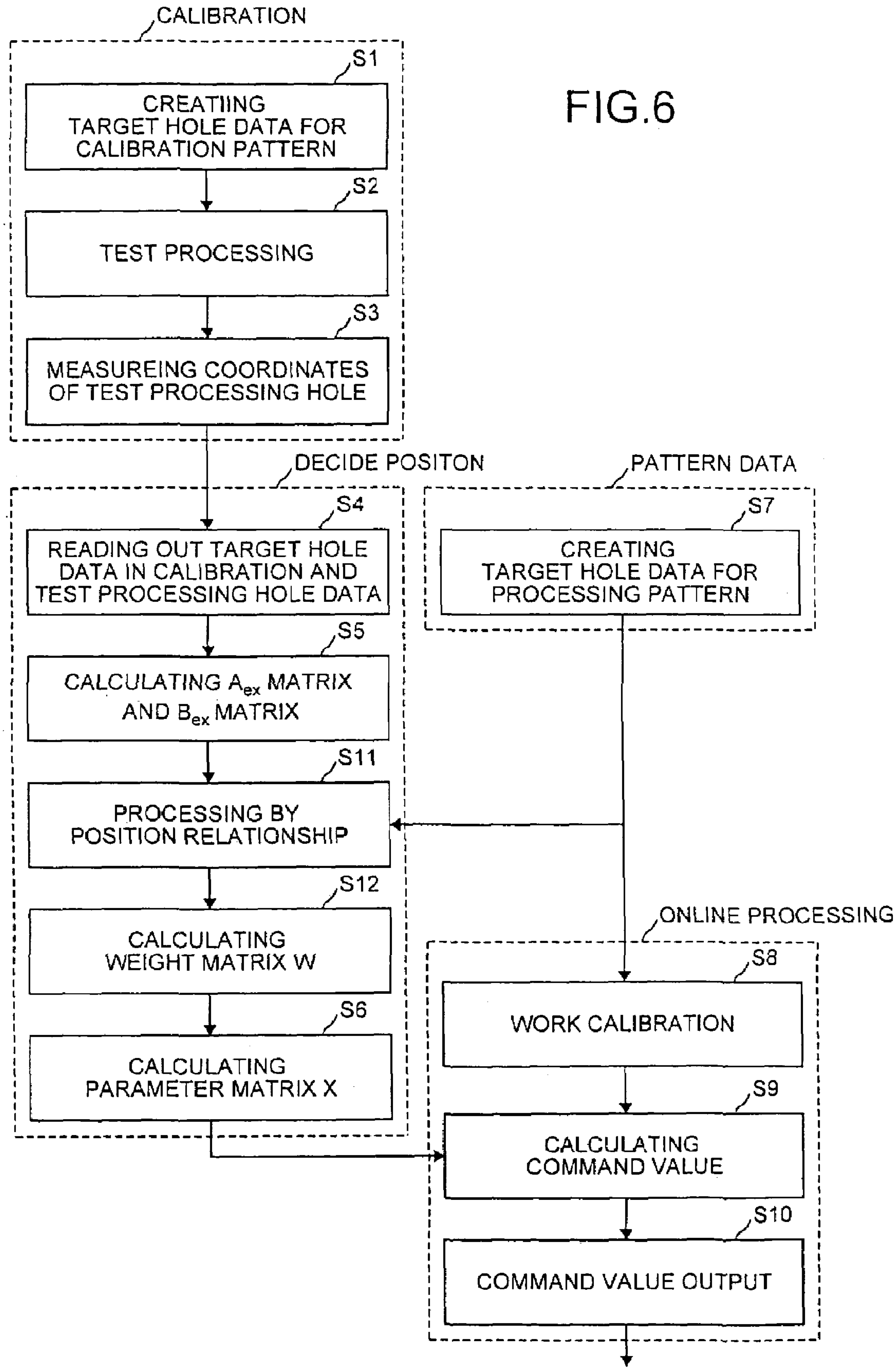
FIG. 6 is a flowchart illustrating the positioning steps by the weighting method.

FIG. 6 is a flowchart illustrating the positioning steps by the weighting method. The processing step in FIG. 6 is roughly divided into four processing steps like FIG. 4: a calibration step, a positioning step, a pattern data creation step, and an on-line-processing step. A different point from FIG. 4 is a processing by the position relation between the processing position data of the test processing hole measured at step S3 and the target position coordinates, prepared at step S7, which is to be made from now on (for example, size of distance) (step S11), and calculation of the weight matrix by the position-related difference (step S12) to obtain the unknown parameter matrix X. As for other processing, it is the same processing procedure as that in FIG. 4, and the same number is assigned to the same part.

When the merit function in consideration of weighting is set to Jw, Jw is given by $$Jw=(WA_{ex}X-WB_{ex})^T(WA_{ex}X-WB_{ex})^T(WA_{ex}X-WB_{ex}) \tag{10}$$

from (8), and the solution Xw that minimized this merit function Jw is obtained as $$Xw = (A_{ex}^T W^T W A_{ex})^{-1} A_{ex}^T W^T W B_{ex} \tag{11}$$

$$= (A_{ex}^T Q A_{ex})^{-1} A_{ex}^T Q B_{ex} \tag{12}$$

from the analogy of (9), where $Q=W^TW$.

(6) Positioning Process by Weighting Method for Each Hole Block

Figure 7:
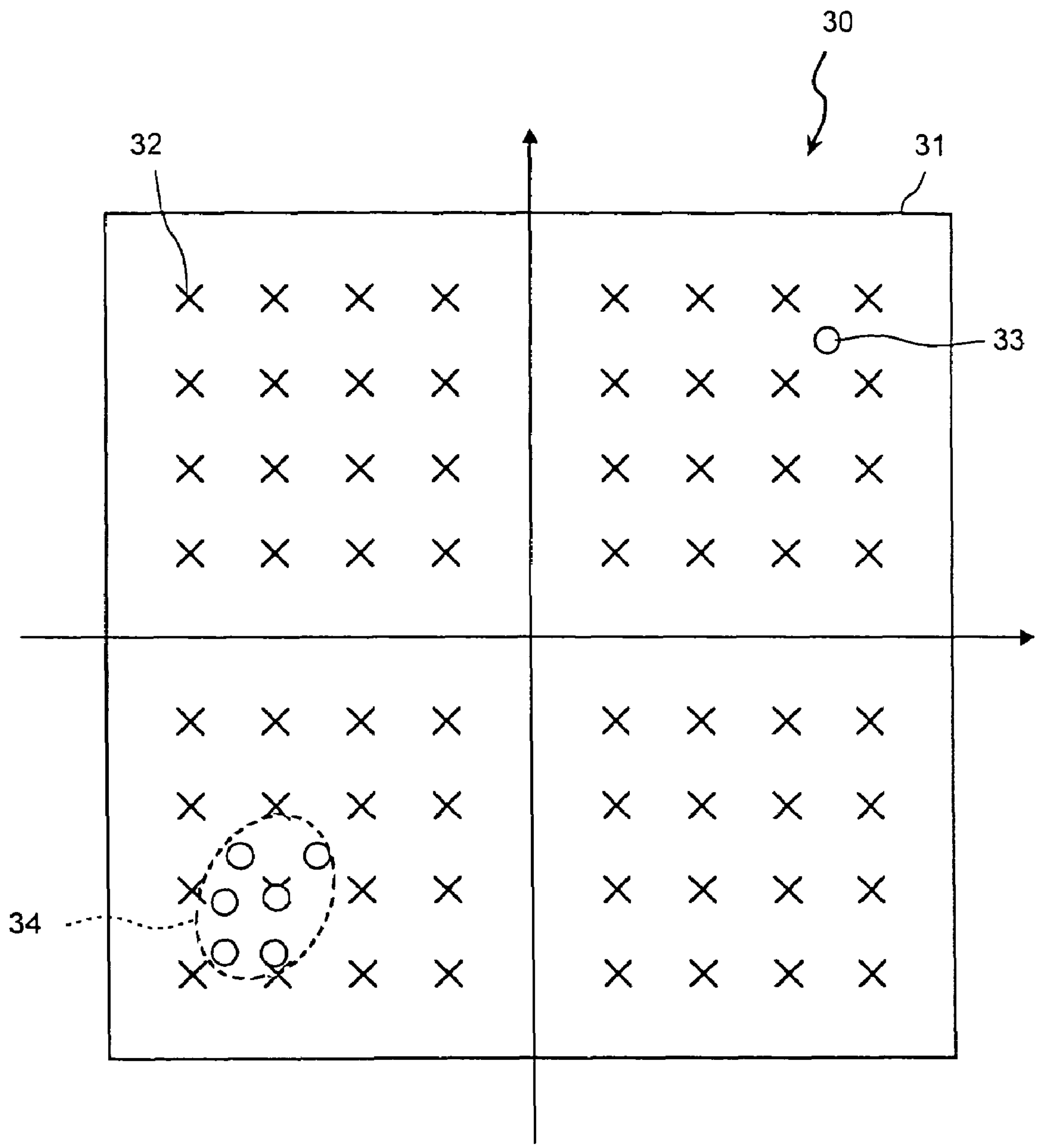
FIG. 7 is a schematic diagram representing the concept of positioning process by weighting method for each hole block according to a first embodiment.

FIG. 7 is a schematic diagram representing the concept of positioning process by weighting method for each hole block according to the first embodiment. FIG. 7 illustrates a processed work piece in which the hole is made with the calibration pattern and the position of the hole which it is going to be made from now on. In this figure, 31, 32, 33, and 34 indicate the work piece, a processed hole by the calibration, the target hole that is desired to be made, and the target position data group that is desired to be made, respectively.

Basically, a distance between the target hole 33 to be made and the processed hole 32 by the calibration is calculated. If the distance is short, the weight of the data will be added, and if the distance is far the weight of the data will be subtracted. As a concrete example, the distance d is defined as the distance between the main target position coordinates at the time of a calibration $({}^ix_d, {}^iy_d)$(i=1, . . . , 100) and the main target position coordinates $(x_d, y_d)$ that is going to be made.

$${}^1d^2=({}^1x_d-x_d)^2+({}^1y_d-y_d)^2$$

$${}^2d^2=({}^2x_d-x_d)^2+({}^2y_d-y_d)^2$$

$$\cdots$$

$${}^{100}d^2=({}^{100}x_d-x_d)^2+({}^{100}y_d-y_d)^2 \tag{13}$$

In addition, when using the sub deflection, and even when using both the main deflection and the sub deflection, the distance can be defined similarly.

What is necessary is just to define a weight to this distance. For example, the following normal distributions are considered, $$^{i}w = \exp\left(-\frac{^{i}d^2}{\sigma^2}\right) \quad i = 1, 2, 3, \cdots \tag{14}$$

where σ is the variance of the distribution, and is a free parameter. A highly precise model is expectable if the variance is made small. However, if the variance is made too small, the weight infinitely approaches 0 in a certain distance, and it becomes impossible to calculate the inverse matrix. The weighting can be defined such that the weight matrix W meets $$W=\text{diag}\{^{1}w, ^{2}w, \ldots ^{100}w\} \tag{15}$$

to the target hole 33 that is going to be made. The diag means the diagonal matrix. The unknown parameter matrix X can be obtained from (11) as $$X = (A_{ex}^T W^T W A_{ex})^{-1} A_{ex}^T W^T W B_{ex} \tag{16}$$

using the weight matrix W.

The weighting method for each hole block adds the weight to the data with a near distance as the data with a high reliability, while subtracting the weight from the data with a far distance as the data with a low reliability. This concept is superior to the mere least squared method explained in (4), which gives uniform treatment to the data with a near distance and the data with a far distance alike.

The above processing is equivalent to the processing procedures of step S11, step S12, and step S6 in the positioning step of FIG. 6. However, at the step S9 in the on line processing step, since it must prepare one unknown parameter matrix for each hole it needs high storage capacity, although it is highly precise.

Therefore, it is recommended to divide the target position data that is going to be made into a group like the target position data group 34, and for example, to make the center of the gravity of the target position data group 34 the coordinates of the representative hole, and just to calculate one unknown parameter matrix for one whole group. Moreover, the operator of the multi-beam laser processing equipment 2 according to the first embodiment can freely change the shape of the group or partially make the group fine according to the purpose of use.

In addition, although the multi-beam laser processing equipment 2 has been explained above, it is needless to say that the concept of the positioning process by weighting method for each hole block is applicable to the single-beam laser processing equipment 1.

Second Embodiment

When using a polynomial model, determination of the degree of the polynomial model is made depending how nonlinear the characteristic of the system of interest is and how good the approximation accuracy should be. In general, although the approximation accuracy becomes good when raising the degree of a polynomial, the necessary calibration points increase or the calculation time at the calculation step command value in the on line processing (step S9 in FIG. 6) increases.

Therefore, it is taken into consideration to raise the approximation accuracy, without increasing calculation time in the on line processing increase so much, and also without increasing the necessary calibration points. It is a second embodiment that applies this concept to the control device 17 of the single-beam laser processing equipment 1 or the multi-beam laser processing equipment 2.

The positioning step according to the second embodiment can be carried out by the flow chart of FIG. 6 like the first embodiment. Processes differ from those of the first embodiment are the processing step according to the position relation of the positioning step (step S12) and the calculation step of the weight matrix W (step S13).

Figure 8:
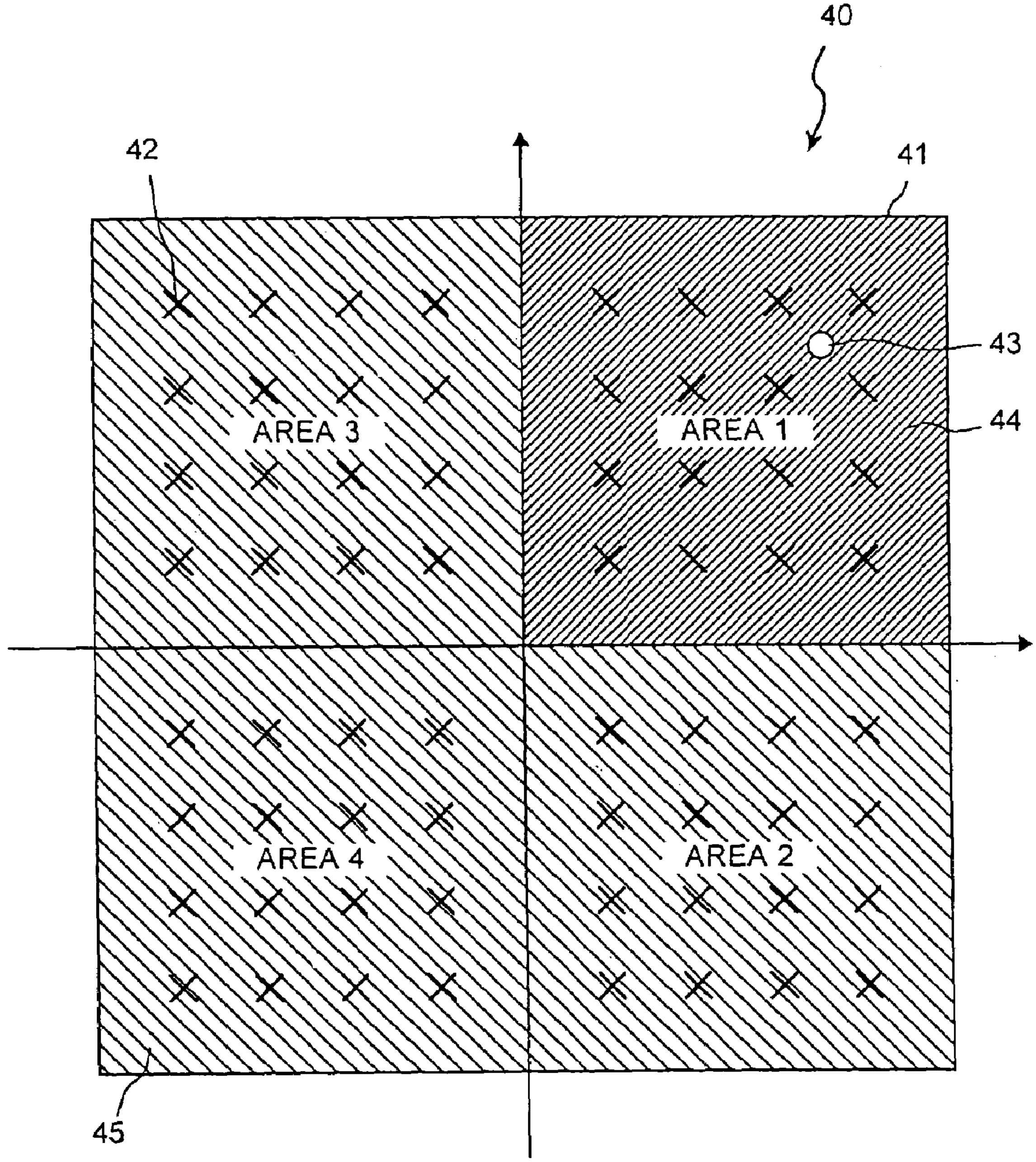
FIG. 8 is a schematic diagram representing the idea of dividing the work piece in FIG. 7 into four areas.

FIG. 8 is a schematic diagram representing the idea of dividing the surface of the work piece in FIG. 7 into four areas. First of all, as shown in FIG. 8, the processing area of the work piece is divided into four areas: area 1-area 4. In this figure, 41 is the work piece, 42 is the calibration hole processed by the calibration, 43 is the target hole to be processed, 44 is the area that is the object of hole processing (area 1 in the figure), and 45 is the area that is not the object of hole processing (area 4 in the figure). Improvement in approximation accuracy is expectable by making an inverse mapping model for every area, respectively, i.e., making a local model.

If the degree of a polynomial is determined as an inverse mapping model, required calibration points will be decided accordingly. When there are few calibration points, a matrix is no longer a non-singular and it becomes impossible-to calculate an inverse matrix, although operation by (16) in processing of the step S6 of FIG. 6 is performed at this time.

As shown in FIG. 8, suppose that the target hole 43 to be processed is located in area 1. When the area 1 is made into the object area 44, the intuitive technique of calculating the coefficient of the inverse mapping model polynomial for the object area 44 is to perform a calculation only using what is in the object area among calibration data. However, if this technique is used, the calibration in the object area must fully be performed for the above reason, and the time for a calibration will increase.

For that reason, in calculating the coefficient of the inverse mapping model polynomial of object area, consider using the calibration data in the non-object area 45 together. Then, the unknown parameter matrix is calculated by applying weight 1 to the calibration data in the object area, and applying 0<weight<1 (for example, 0.1 etc.) to the calibration data in the non-object area. Thus, an unknown parameter matrix peculiar to the object area can be calculated effectively, without increasing the calibration data in object area by applying a weight. When the test 1 is inside of the object area, and the test 2 and 3 are inside of the non-object area W is can be expressed as $$W=\text{diag}\{1, 0.1, 0.1, \ldots\} \tag{17}$$

using the diagonal matrix (diag).

Namely, in the above example, since the test 1 is inside of the object are and the test 2 and 3 are inside of the non-object area, it means that what is necessary is just to make a weight matrix of which the diagonal elements are 1, 0.1, . . . , 0.1 in order.

An unknown parameter matrix can be calculated using the following equation (16) (rewrite).

$$X = (A_{ex}^T W^T W A_{ex})^{-1} A_{ex}^T W^T W B_{ex} \tag{16}$$

In addition, the number of division of area is not limited to four, but any number is sufficient as long as it is plurality.

The shape of area is not limited to a rectangle, but can be set up, for example, the area bordering on the concentric circle which makes distance from the center the same.

The quick weighting method described above can be commonly applied to both the single-beam laser processing equipment 1 and the multi-beam laser processing equipment 2.

Third Embodiment

If a system does not change with time, only the first one time of calibration is enough. However, in practice, any system shows a time dependent variation due to change of lens characteristic or change of beam characteristic, etc. caused by heat. The operator of laser processing equipment, when judging that the system is changed with time collapse, has to perform a calibration again.

However, it is not a good idea to redo the work whenever a change of a system with time occurs, which interrupts processing, performs test processing for hundreds of points further, and checks processing positions with a CCD camera.

For that reason, the concept of a forgetting factor was introduced as a processing for raising approximation accuracy, without increasing the processing time in calibration processing and positioning processing. It is a third embodiment that applies the calibration processing using the forgetting factor to the control device 17 of the single-beam laser processing equipment 1 or the multi-beam laser processing equipment 2.

Usually, in terms of the test points required for one time of calibration, after determining the degree of the polynomial model depending how nonlinear the optical system is and how good the approximation accuracy should be, the number of terms of the polynomial at least is needed. Moreover, matrix must be a full rank in order for an inverse matrix to be calculated, which is equivalent to the information acquired by the calibration being rich enough. Supposing the test points of the first calibration are 100 points, the second calibration also uses 100 test points, and the unknown parameter matrix X will be recalculated by the matrix made from the new calibration.

$A_{ex}$ matrix and $B_{ex}$ matrix obtained from the first calibration are expressed as follows from (7) (rewrite).

$$A_{ex} = \begin{bmatrix} {}^{1}A \\ {}^{2}A \\ \vdots \\ {}^{100}A \end{bmatrix} \quad B_{ex} = \begin{bmatrix} {}^{1}B \\ {}^{2}B \\ \vdots \\ {}^{100}B \end{bmatrix} \tag{7}$$

Since the test number is from 101 in the calibration of the second henceforth, $A_{ex}$ matrix and $B_{ex}$ matrix can be expressed as $$A_{ex} = \begin{bmatrix} {}^{101}A \\ {}^{102}A \\ \vdots \\ {}^{200}A \end{bmatrix} \quad B_{ex} = \begin{bmatrix} {}^{101}B \\ {}^{102}B \\ \vdots \\ {}^{200}B \end{bmatrix} \tag{18}$$

The unknown parameter matrix can be calculated using the newly made matrix. However, performing hundreds of points of test processing, whenever a change of a system with time occurs, has the problem of taking too much time. To cope with the problem, the following things are considered. The equation (12) to calculate the unknown parameter matrix X is (rewrite)

$$X = (A_{ex}^T Q A_{ex})^{-1} A_{ex}^T Q B_{ex} \tag{12}$$

$$(\text{where, } Q = W^T W)$$

By defining D and N in (12) as $$D = A_{ex}^T Q A_{ex} \tag{19}$$

$$N = A_{ex}^T Q B_{ex} \tag{20}$$

(11) can be expressed as $$X_1 = D^{-1} N \tag{21}$$

The number 1 at the lower right of $X_1$ means the number of times of calibration. Now, consider calculating a parameter by increasing the number of processing holes, namely, newly increasing several sets of calibration data. Then, the equation can be written as follows:

$$X_2 = (D + d_2)^{-1}(N + n_2) \tag{22}$$

where $d_2$ and $n_2$ are matrices made from the calibration data of newly processed holes. Although it is ideal if it calculation of a parameter $$d_2^{-1} n_2 = \ldots \tag{23}$$

is possible only by $d_2$ and $n_2$, $d_2$ and $n_2$ cannot be calculated if the number of data is not sufficient. It is because, if the number of data is not sufficient, $d_2^{-1}$ cannot be a full rank, and consequently cannot make an inverse matrix.

A parameter can be calculated using (22), however, when the system is changing with temperature change etc., although the newly obtained data is reliable, the past data is not necessarily so reliable.

To cope with the problem, the forgetting factor k is introduced as the reliability of the past data, or a grade of the degree that forgets the past data. k is a real number in the range of $0 \leqq k \leqq 1$. k=0 is equivalent to not using the information on past at all, and k=1 is equivalent to using all the information on past, i.e., not forgetting.

The unknown parameter matrix $X_2$ becomes $$X_2 = (kD + d_2)^{-1}(kN + n_2) \tag{24}$$

What is necessary is hereafter, just to repeat this processing at every calibration.

Figure 9:
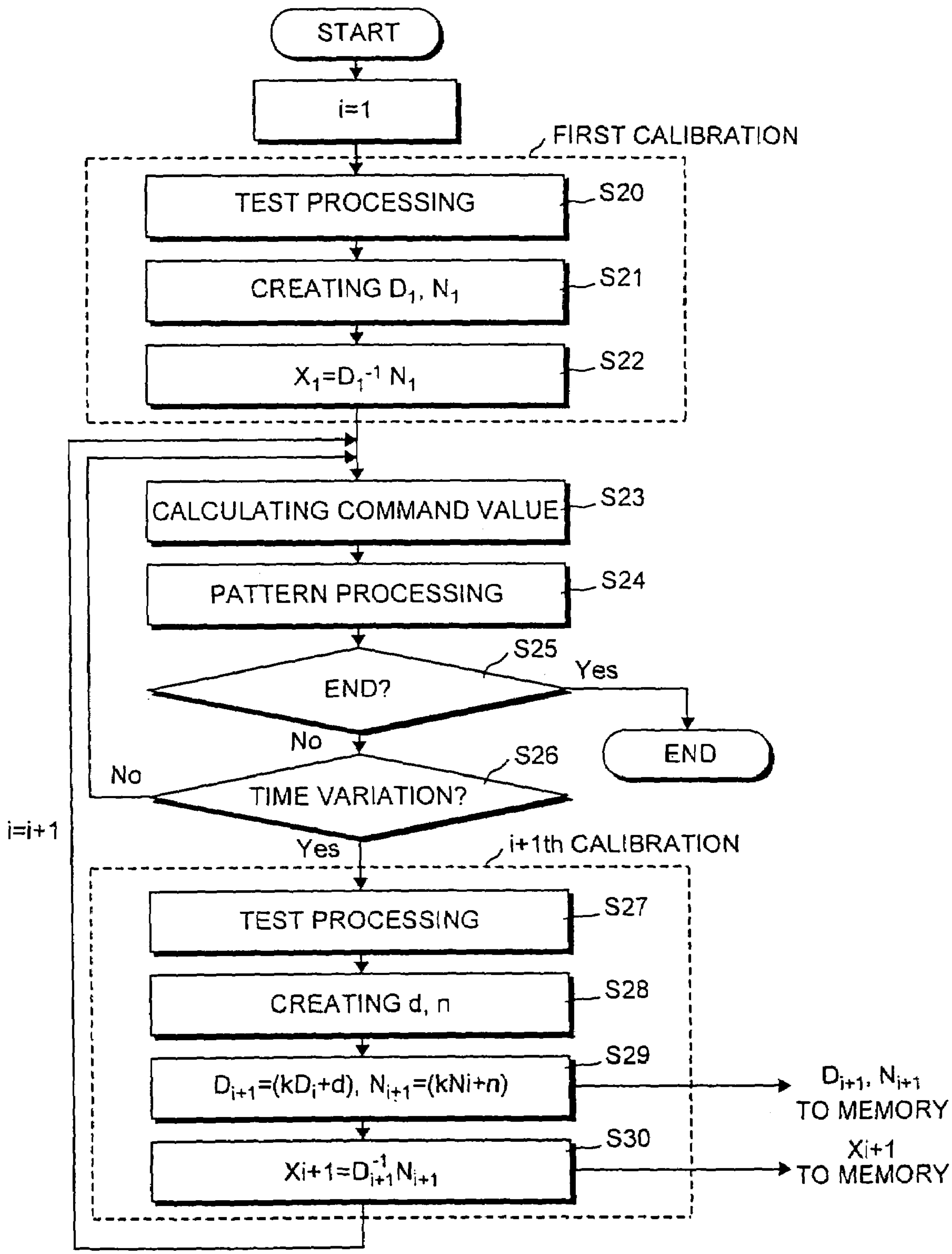
FIG. 9 is a flowchart illustrating the process flow according to a third embodiment.

FIG. 9 is a flowchart illustrating the process flow according to the third embodiment. This figure illustrates the processing flow of only a portion related to the calibration processing using the forgetting factor among processings of the calibration step, the positioning step, and the on-line-processing step in FIG. 6 representing the processing flows of the first and second embodiments.

In FIG. 9, test processing equivalent to the calibration step of FIG. 6 is performed at the time of the first calibration (step S20). Then, creation of $D_1$ and $N_1$ equivalent to the positioning step of FIG. 6 (step S21) and calculation of $X_1$ (step S22) are performed, and saved in the memory. Calculation of the command value equivalent to the on-line-processing step of FIG. 6 is performed (step S23), and pattern processing is performed (step S24). The end of the pattern processing at the last is judged (step S25), and when the pattern processing is carried out succeedingly, it judges whether there is any change with time (step S26). If there is no change with time, a series of pattern processing is continued by the instruction value calculated based on the present unknown parameter X.

When a judgment is made that there is a change with time at the step S26, it shifts to processing of the i+1 calibration step. Here, test processing by the new test pattern of several points and measurement of processing position coordinates are performed (step S27), d and n are created based on this processing hole information on several points (step S28), and $D_{i+1}$ and $N_{i+1}$ are created based on the equation using the forgetting factor shown in the figure (step S29), and $X_{i+1}$ is calculated (step S30). After that, calculation (step S23) and pattern processing (step S24) of an instruction value are performed like the first calibration.

Comparing (21) with (19), (21) can obtain even better results from the point that a reliability is set to the newly measured data. Moreover, unlike (20), since there are enough number of data, the rank of the matrix does not decrease, and the inverse matrix calculation does not become impossible.

Furthermore, the parameter equation at the time of the third calibration becomes $$X_3 = (k(kD + d_2) + d_3)^{-1}(k(kN + n_2) + n_3) \tag{25}$$

$$= (k^2D + kd_2 + d_3)^{-1}(k^2N + kn_2 + n_3), \tag{26}$$

and the first data is forgotten whenever the number of times of a calibration increases. As represented in (21)–(23), it is not necessary to keep all the test data in the past calibration, but it is enough to keep two matrices, matrix N and matrix D that are created for every calibration.

When the number of test points in a new calibration is fewer than the terms of a model polynomial, the following method considering an addition at the time of the operation of an inverse matrix is effective.

Now, if it places with $D^{-1}=P$ in (21), i.e., if $P_i$ is defined such that $X_i=P_iN_i$, the i+1 matrix can be calculated as follows from $P_i$ matrix at the time of the i–th calibration:

$$P_{i+1} = (kP_i^{-1} + a^Tqa)^{-1} \tag{27}$$

$$= \frac{P_i}{k} - \frac{P_i}{k}a^T\left(q^{-1} + a\frac{P_i}{k}a^T\right)^{-1}a\frac{P_i}{k} \tag{28}$$

In order to express the equation simply, $A_{ex}$ matrix obtained from the newly measured data in the i+1st calibration and the weight matrix Q at that time ($=W^TW$) are described as a and q, respectively. $X_{i+1}$ using the $P_{i+1}$ is obtained as $$X_{i+1} = P_{i+1}N_{i+1} = P_{i+1}(kN_i + n_{i+1}) \tag{29}$$

$$= P_{i+1}(kD_iX_i + n_{i+1}) \tag{30}$$

where $n_{i+1}$ ($=a^Tqb$) is the matrix $A_{ex}QB_{ex}$ obtained from the newly measured data in the i+1st calibrations.

Figure 10:
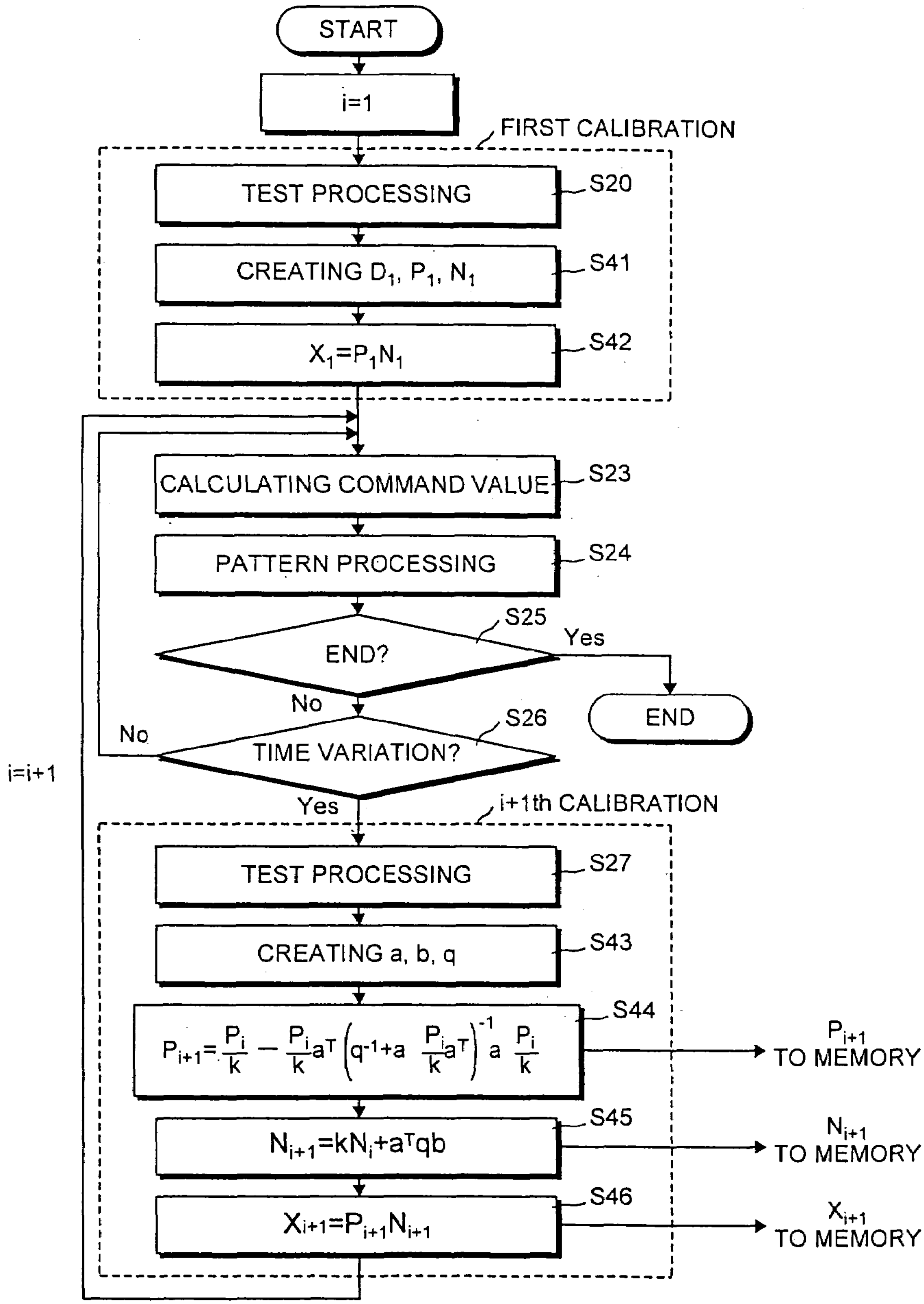
FIG. 10 is a flowchart illustrating the process flow of a special case in the flow chart of FIG. 9 (number of new test runs<number of terms in polynomials)
Figure 11:
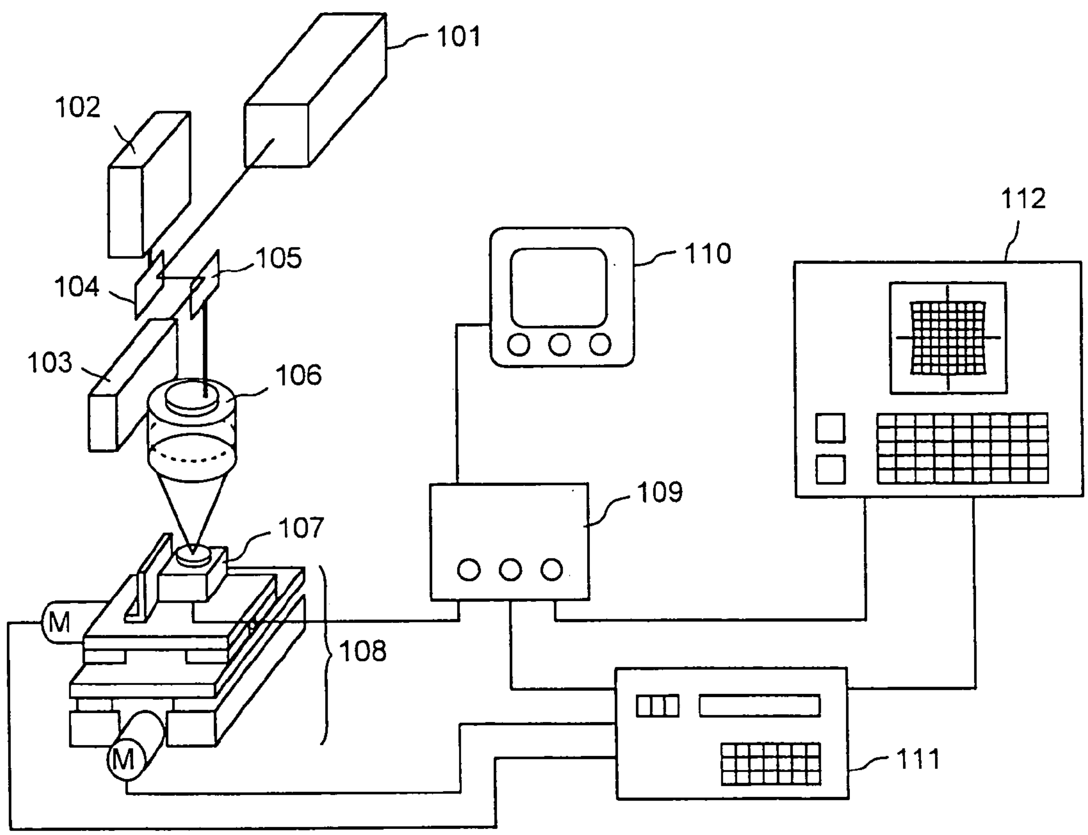
FIG. 11 is a schematic diagram of a laser processing equipment with a lens distortion compensation device according to the conventional technology.

FIG. 10 is a flowchart illustrating the process flow of a special case in the flow chart of FIG. 9 (number of new test runs<number of terms in polynomials). The same symbol is assigned to the portion of the same processing step as FIG. 9. Hereafter, it explains focusing on a different portion from the flow of FIG. 9.

In FIG. 10, $D_1$, $N_1$, and $P_1$ are created at step S41 at the time of the first calibration. At step S42, $X_1$ is calculated using this $P_1$. About calculation of the instruction value and pattern processing etc. in steps S23–S27, it is the same as that of FIG. 9. In the i+1th calibration step, a, b, and q are created at the step S43, $P_i$ is calculated using the forgetting factor k and $P_{i+1}$ is calculated from a and (28) at the step S44. $N_{i+1}$ and $X_{i+1}$ are calculated at the steps S45 and S46, respectively. Then, calculation of the command value and the pattern processing are performed in the same manner as the first calibration.

In this method, the inverse matrix calculation is equivalent to the second term of (28), and the size of the matrix is [number of the new test point]×[number of the new test point]. Since the size of the matrix for the inverse matrix calculation in (24) is [number of the terms of the polynomial]×[number of the terms of the polynomial], if [number of the new test point]<[number of the terms of the polynomial], it is possible to reduce the calculation load. This can attain shortening of the whole processing time in a system that gives priority to processing time over processing accuracy by making size of a matrix compact and shortening the calculation time to obtain an inverse matrix.

In addition, the calibration technique using the forgetting factor mentioned above is commonly applicable to both the single-beam laser processing equipment 1 and the multi-beam laser processing equipment.

As described above, according to the present invention, since the control unit calculates an unknown parameter matrix that optimally determines the command value to guide the laser beam onto the target position on the work piece by applying a weight to the coordinates of the processed position and the command value based on which the beam scanning unit performed the processing at the processed position, according to a distance between the coordinates of the target position and the coordinates of the processed position, it is possible to reduce errors caused by the model error between the conventional polynomial model and the actual system, and even when the approximation accuracy is raised it is possible to suppress increase in calibration time and calculation time.

According to the present invention, since the control unit calculates an unknown parameter matrix by weighting the coordinates of the processed position and the command value, according to a forgetting factor k where $0 \leqq k \leqq 1$ associated with the time information of the command value, even when the approximation accuracy of a polynomial model is raised, it is possible to suppress increase in calibration time and calculation time, and maintain the process accuracy even against change of the size of work piece and/or time variation of status of the system.

According to the present invention, since the control unit calculates an unknown parameter matrix that optimally determines the command value to guide the laser beam onto the target position on the work piece by applying a weight to the coordinates of the processed position and the command value, according to a distance between coordinates of a representative position of a target position group comprising a plurality of the target positions and the coordinates of the processed position, it is possible to reduce calibration time and calculation time because the approximation accuracy near the processing position can be raised without increasing the number of terms of the polynomial model. Besides, since what is necessary is just to memorize the unknown parameter corresponding to the coordinates of the representative position, it is possible to save the memory device.

According to the present invention, since the control unit calculates an unknown parameter matrix that optimally determines the command value to guide the laser beam onto the target position on the work piece by applying a weight to coordinates of the center of the gravity position of a target position group comprising a plurality of the target positions and the command value, according to a distance between coordinates of a representative position of a target position group and the coordinates of the processed position, the approximation accuracy near the processing position can be raised without increasing the number of terms of the polynomial model. As a result, it is possible to reduce calibration time and calculation time. Besides, since what is necessary is just to memorize the unknown parameter corresponding to the coordinates of the representative position, it is possible to save the memory device. Furthermore, equal approximation accuracy without a bias can be given to all the target positions of a target position group.

According to the present invention, since the control unit calculates an unknown parameter matrix that optimally determines the command value to guide the laser beam onto the target position on the work piece by dividing a surface of the work piece into a plurality of areas, applying a unity weight to an corresponding area with the target position, and applying a weight less than unity to a non-corresponding area without the target position, even when the approximation accuracy of a polynomial model is raised, it is possible to suppress increase in calibration time and calculation time, and maintain the process accuracy even though the size of work piece is changed.

According to the present invention, since the control unit calculates an unknown parameter matrix that optimally determines the command value to guide the laser beam onto the target position on the work piece by dividing a surface of the work piece into four areas, applying a unity weight to an corresponding area with the target position, and applying a weight less than unity to the rest of three areas without the target position, even when the approximation accuracy of a polynomial model is raised, it is possible to suppress increase in calibration time and calculation time, and maintain the process accuracy even though the size of work piece is changed.

According to the present invention, since the control unit calculates an unknown parameter matrix that optimally determines the command value to guide the laser beam onto the target position on the work piece by dividing a surface of the work piece into areas bordering on a concentric circle that makes distance from the center the same, applying a unity weight to a corresponding area with the target position, and applying a weight less than unity to the rest of areas, even when the approximation accuracy of a polynomial model is raised, it is possible to suppress increase in calibration time and calculation time, and maintain the process accuracy even though the size of work piece is changed. Besides, since it is possible to raise the accuracy at a portion far away from the center, where error of the optical unit becomes relatively large, equal approximation accuracy without a bias can be obtained.

According to the present invention, since the control unit calculates an unknown parameter matrix that optimally determines the command value to guide the laser beam onto the target position on the work piece by using an forgetting factor k ($0 \leqq k \leqq 1$) that changes the amount of weighting to the coordinates of the processed position and the command value, according to the time order of the command value information, even when the approximation accuracy of a polynomial model is raised, it is possible to suppress increase in calibration time and calculation time, and maintain the process accuracy even against change of the size of work piece and/or time variation of status of the system.

According to the present invention, since the control unit calculates X using $$X=(kD+d)^{-1}(kN+n)$$

where X is the unknown parameter matrix that optimally determines the command value to guide the laser beam onto the target position on the work piece; k is the forgetting factor ($0 \leqq k \leqq 1$) that changes the amount of weighting to the coordinates of the processed position and the command value based on which the beam scanning unit performed the processing at the processed position, according to the time order of the command value information; $Q=W^TW$, $D=A_{ex}^TQA_{ex}$, $N=A_{ex}^TQB_{ex}$, where $A_{ex}$ is a matrix in which a set of data in which a plurality of combination of coordinates of the work piece position at the time of the first calibration and coordinates of their equivalent target position are arranged by the number of calibration point, $B_{ex}$ is a matrix comprising the command value to the beam scanning unit corresponding to $A_{ex}$, and W is a weight matrix comprising weight values that should be applied to $A_{ex}$ and $B_{ex}$; d is a matrix corresponding to D at the time of a new calibration; and n is a matrix corresponding to N, even when the approximation accuracy of a polynomial model is raised, it is possible to suppress increase in calibration time and calculation time, and maintain the process accuracy even against change of the size of work piece and/or time variation of status of the system. Besides, when re-calculating the inverse matrix, since the data that will be newly added can be kept less than the number of the unknown parameter, it is possible to reduce the re-calculation time, and as a result, it is possible to reduce the entire processing time.

According to the present invention, the control unit calculates X, when the number of test points at the time of a new calibration is fewer than the number of terms of the unknown parameter matrix, and when $a=A_{ex}$, $q=Q$, $b=B_{ex}$, and $P=D^{-1}$, using $$X=\left\{\frac{P_i}{k}-\frac{P_i}{k}a^T\left(q^{-1}+a\frac{P_i}{k}a^T\right)^{-1}a\frac{P_i}{k}\right\}(kN+n)$$

where X is the unknown parameter matrix that optimally determines the command value to guide the laser beam onto the target position on the work piece; k is the forgetting factor ($0 \leqq k \leqq 1$) that changes the amount of weighting to the coordinates of the processed position and the command value based on which the beam scanning unit performed the processing at the processed position, according to the time order of the command value information;

$$Q = W^T W,\ D = A_{ex}^T Q A_{ex},\ N = A_{ex}^T Q B_{ex},$$

where, $A_{ex}$ is a matrix in which a set of data in which a plurality of combination of coordinates of the work piece position at the time of the first calibration and coordinates of their equivalent target position are arranged by the number of calibration point, $B_{ex}$ is a matrix comprising the command value to the beam scanning unit corresponding to $A_{ex}$, and W is a weight matrix comprising weight values that should be applied to $A_{ex}$ and $B_{ex}$; d is a matrix corresponding to D at the time of a new calibration; and n is a matrix corresponding to N, even when the approximation accuracy of a polynomial model is raised, it is possible to suppress increase in calibration time and calculation time, and maintain the process accuracy even against change of the size of work piece and/or time variation of status of the system. Besides, when re-calculating the inverse matrix, since the size of inverse matrix operation can be made compact, it is possible to reduce the calculation time of inverse matrix, and as a result, it is possible to reduce the entire processing time.

INDUSTRIAL APPLICABILITY

As described above, the laser beam positioning device for a laser processing equipment according to the present invention is suitable for a delicate technology, such as drilling, cutting, trimming, and scribing of PCBs on which the electronic parts are mounted.

What is claimed is:

1. A laser beam positioning device for laser processing equipment comprising:

a stage where a work piece is placed;

a laser oscillator that emits a laser beam;

an optical unit that guides the laser beam so that the laser beam irradiates the work piece placed on the stage;

a beam scanning unit that scans the laser beam guided by the optical unit, based on a command value, to process the work piece;

a measurement unit that measures a processed position on the work piece at which the laser processing has been performed; and a control unit that calculates the command value from coordinates of the processed position and coordinates of a target position, wherein the control unit calculates an unknown parameter matrix by weighting the coordinates of the processed position and the command value, according to a distance between the coordinates of the target position and the coordinates of the processed position, the unknown parameter matrix optimally determining the command value to guide the laser beam onto the target position on the work piece.

2. The laser beam positioning device according to claim 1, wherein the control unit calculates the unknown parameter matrix by weighting the coordinates of the processed position and the command value, according to a normal distribution of distances between the coordinates of the target position and the coordinates of the processed position.

3. The laser beam positioning device according to claim 1, wherein the control unit calculates the unknown parameter matrix by weighting the coordinates of the processed position and the command value, according to distance between coordinates of a representative position of a target position group having a plurality of the target positions and the coordinates of the processed position.

4. The laser beam positioning device according to claim 3, wherein the representative position is the center of the gravity of the target position group.

5. A laser beam positioning device for laser processing equipment comprising:

a stage where a work piece is placed;

a laser oscillator that emits a laser beam;

an optical unit that guides the laser beam so that the laser beam irradiates the work piece placed on the stage;

a beam scanning unit that scans the laser beam, based on a command value, to process the work piece;

a measurement unit that measures a processed position on the work piece at which the laser processing has been performed; and a control unit that calculates the command value from coordinates of the processed position and coordinates of a target position, wherein the control unit calculates an unknown parameter matrix by dividing a surface of the work piece into a plurality of areas, applying a weight of one to an area with the target position, and applying a weight less than one to an area without the target position, the unknown parameter matrix optimally determining the command value to guide the laser beam onto the target position on the work piece.

6. The laser beam positioning device according to claim 5, wherein the plurality of areas is four areas.

7. The laser beam positioning device according to claim 5, wherein each of the areas on the surface of the work piece are set as areas bordering on results from dividing by a concentric circle that makes distance from the center the same.

8. A laser beam positioning device for laser processing equipment comprising:

a stage where a work piece is placed;

a laser oscillator that emits a laser beam;

an optical unit that guides the laser beam so that the laser beam irradiates the work piece placed on the stage;

a beam scanning unit that scans the laser beam, based on a command value, to process the work piece;

a measurement unit that measures a processed position on the work piece at which the laser processing has been performed; and a control unit that calculates the command value from coordinates of the processed position and coordinates of a target position, wherein the control unit calculates an unknown parameter matrix by weighting the coordinates of the processed position and the command value, according to a forgetting factor k where ($0 \leqq k \leqq 1$) associated with time information of the command value, the unknown parameter matrix optimally determining the command value to guide the laser beam onto the target position on the work piece.

9. The laser beam positioning device according to claim 8, wherein the control unit calculates X from $X=(kD+d)^{-1}(kN+n)$ where X is the unknown parameter matrix;

k is the forgetting factor;

$D=A_{ex}{}^T QA_{ex}$, $N=A_{ex}{}^T QB_{ex}$, and $Q=W^T W$ where $A_{ex}$ is a matrix in which a set of data indicating any one of 1) a plurality of combination of coordinates of the work piece position at a first calibration and 2) a plurality of combination of coordinates of the target position are arranged by number of calibration points;

$B_{ex}$ is a matrix formed by the command value corresponding to $A_{ex}$; and

W is a weight matrix formed by values for weighting $A_{ex}$ and $B_{ex}$;

d is a matrix corresponding to D at the time of a new calibration; and n is a matrix corresponding to N.

10. The laser beam positioning device according to claim 8, wherein the control unit calculates X from $$X = \left\{ \frac{P_i}{k} - \frac{P_i}{k} a^T \left( q^{-1} + a \frac{P_i}{k} a^T \right)^{-1} a \frac{P_i}{k} \right\} (kN + n)$$

where

X is the unknown parameter matrix;

k is the forgetting factor;

$$D = A_{ex}^T Q A_{ex},\ N = A_{ex}^T Q B_{ex},$$

and $Q = W^T W$ where $A_{ex}$ is a matrix in which a set of data indicating any one of 1) a plurality of combination of coordinates of the work piece position at a first calibration and 2) a plurality of combination of coordinates of the target position are arranged by number of calibration points;

$B_{ex}$ is a matrix formed by the command value corresponding to $A_{ex}$; and

W is a weight matrix formed by values for weighting $A_{ex}$ and $B_{ex}$;

n is a matrix corresponding to N; and $a = A_{ex}$, $q = Q$, and $b = B_{ex}$, when the number of test points at the time of a new calibration is smaller than the number of terms of the unknown parameter matrix.

* * * * *